US006821494B2

(12) United States Patent
Zhu et al.

(10) Patent No.: US 6,821,494 B2
(45) Date of Patent: Nov. 23, 2004

(54) OXYGEN-ASSISTED WATER GAS SHIFT REACTOR HAVING A SUPPORTED CATALYST, AND METHOD FOR ITS USE

(75) Inventors: Tianli Zhu, Vernon, CT (US); Ronald G. Silver, Tolland, CT (US); Sean C. Emerson, Windsor, CT (US); Richard J. Bellows, Ellington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 490 days.

(21) Appl. No.: 09/919,290

(22) Filed: Jul. 31, 2001

(65) Prior Publication Data

US 2003/0026747 A1 Feb. 6, 2003

(51) Int. Cl.$^7$ .................................................. B01J 8/00
(52) U.S. Cl. ...................................... 422/194; 422/211
(58) Field of Search ............................... 422/190, 191, 422/194, 211; 48/127.9, 128, 197 R, 198.7

(56) References Cited

U.S. PATENT DOCUMENTS

| | | | |
|---|---|---|---|
| 3,852,501 A | 12/1974 | Muenger | 252/373 |
| 3,919,114 A | * 11/1975 | Reynolds | 252/373 |
| 4,021,366 A | 5/1977 | Robin et al. | 252/373 |
| 4,170,573 A | 10/1979 | Ernest et al. | 252/462 |
| 4,308,176 A | 12/1981 | Kristiansen | 252/463 |
| 5,073,532 A | 12/1991 | Domesle et al. | 502/304 |
| 5,464,606 A | 11/1995 | Buswell et al. | 423/655 |
| 6,033,634 A | 3/2000 | Koga | 422/198 |
| 6,040,265 A | 3/2000 | Nunan | 502/242 |
| 6,455,008 B1 | * 9/2002 | Aoyama et al. | 422/106 |
| 6,455,182 B1 | * 9/2002 | Silver | 429/17 |
| 6,476,084 B2 | * 11/2002 | Whitney | 518/700 |
| 6,524,550 B1 | * 2/2003 | Chintawar et al. | 423/650 |
| 2002/0172630 A1 | * 11/2002 | Ahmed et al. | 422/190 |
| 2002/0174603 A1 | * 11/2002 | Ahmed et al. | 48/197 R |

FOREIGN PATENT DOCUMENTS

| | | | |
|---|---|---|---|
| JP | 2000203804 A | * 7/2000 | |
| WO | WO 97/44123 | 11/1997 | |

OTHER PUBLICATIONS

A. Martinez–Arias, et al, "EPR study on oxygen handling properties of ceria, zirconia and Zr–Ce (1:1) mixed oxide samples", Catalysis Letters, 65 (2000), pp. 197–204.

Toshimasa Utaka, et al, "CO removal by oxygen–assisted water gas shift reaction over supported Cu catalysis", Applied Catalysts, (A: General), (2000), pp. 21–26.

T.Bunluesin, et al, "Studies of the water–gas–shift reaction on ceria–supported Pt, Pd, and Rh: implications for oxygen storage properties", Applied Catalysis, (B: Environmental), 1998, pp. 107–114.

P. Fornasiero, et al, "Rh–Loaded CeO2–ZrO2 Solid Solutions as Highly Efficient Oxygen Exchangers: Dependence of the Reduction Behavior and the Oxygen Storage Capacity on the Structural Properties", Journal of Catalysis 151 (1995), pp. 168–177.

* cited by examiner

Primary Examiner—Kiley S. Stoner
Assistant Examiner—Kevin McHenry
(74) Attorney, Agent, or Firm—Stephen A. Schneeberger

(57) ABSTRACT

A shift converter, or reactor, (16HT, 16LT) in a fuel processing subsystem (14, 16HT, 16LT, 18), as for a fuel cell (12), uses an improved catalyst bed (34, 50) and the addition of oxygen (40, 40A, 40B, 40C, 40D, 41A, 41B, 41C, 41D) to reduce the amount of carbon monoxide in a process gas stream. The catalyst of bed (34, 50) is a metal, preferably a noble metal, having a promoted support of metal oxide, preferably ceria and/or zirconia. A water gas shift reaction converts carbon monoxide to carbon dioxide. The oxygen may be introduced as air, and causes an improvement in carbon monoxide removal. Use of the added oxygen enables the shift reactor (16HT, 16LT) and its catalyst bed (34, 50) to be relatively more compact for performing a given level of carbon monoxide conversion. The catalyst bed (34, 50) obviates the requirement for prior reducing of catalysts, and minimizes the need to protect the catalyst from oxygen during operation and/or shutdown.

5 Claims, 4 Drawing Sheets

US 6,821,494 B2

OXYGEN-ASSISTED WATER GAS SHIFT REACTOR HAVING A SUPPORTED CATALYST, AND METHOD FOR ITS USE

TECHNICAL FIELD

This invention relates to hydrocarbon fuel processing, and more particularly to an improved shift reactor and its operation with a supported catalyst used therein. More particularly still, the invention relates to an improved shift reactor and its operation with a supported catalyst, for processing hydrogen-rich gas streams, as for use in fuel cells.

BACKGROUND ART

Fuel cell power plants that utilize a fuel cell stack for producing electricity from a hydrocarbon fuel are well known. In order for the hydrocarbon fuel to be useful in the fuel cell stack's operation, it must first be converted to a hydrogen-rich stream. Hydrocarbon fuels that are used by the fuel cell stack pass through a reforming process (reformer) to create a process gas having an increased hydrogen content that is introduced into the fuel cell stack. The resultant process gas contains primarily water, hydrogen, carbon dioxide, and carbon monoxide. The process gas has about 10% carbon monoxide (CO) upon exit from the reformer.

Anode electrodes, which form part of the fuel cell stack, can be "poisoned" by a high level of carbon monoxide. Thus, it is necessary to reduce the level of CO in the process gas, prior to flowing the process gas to the fuel cell stack. This is typically done by passing the process gas through a water gas shift (WGS) converter, or shift reactor, and possibly additional reactors, such as a selective oxidizer, prior to flowing the process gas to the fuel cell stack. The shift reactor also increases the yield of hydrogen in the process gas.

Shift reactors for reducing the CO content of process gas are well known, and typically comprise a chamber having an inlet for entry of the process gas into the chamber, an outlet downstream of the inlet for exit of effluent from the chamber, and a catalytic reaction zone between the inlet and the outlet. The catalytic reaction zone typically contains a catalyst, or catalyst composition, for converting at least a portion of the carbon monoxide in the process gas into carbon dioxide. In operation, a shift reactor carries out an exothermic shift conversion reaction represented by the following equation:

$$CO + H_2O \rightarrow CO_2 + H_2 \qquad (1)$$

The reaction (1) between the CO and water concurrently reduces the CO content and increases the $CO_2$ and $H_2$ content of the process gas. The generation of additional hydrogen from this reaction is advantageous to the power plant inasmuch as hydrogen is consumed at the fuel cell anode to produce power. A discussion of one such shift reactor, or converter, is contained in PCT Application U.S. 97/08334 for "Shift Converter", published on 27 Nov. 1997 as WO 97/44123. In the shift converter of that application, a catalyst bed contains a catalyst composition of copper and zinc oxide, or copper, zinc oxide, and alumina. Such catalyst composition is further disclosed in U.S. Pat. No. 4,308,176 to Kristiansen, and has been used for a number of years to promote the shift reaction in the shift reactors associated with fuel cell power plants. However, reactors using these catalyst compositions have the limitation that they must be purged with a flow of hydrogen to initially reduce them, and steps must be taken subsequent to operation to prevent significant oxidation or exposure to oxygen. In fact, the required reaction does not work, or occur, unless the catalyst is reduced. Exposure of these catalyst compositions to oxygen is, or may be, detrimental to the catalyst. This is because the catalyst is self-heating in the presence of oxygen, and it can easily heat itself to the point where catalyst particles will sinter, and thus lose surface area and decrease activity. This need to provide a reducing atmosphere and to minimize the possibility of oxygen leaks to the catalyst with a special shutdown purge and the maintenance of an inert atmosphere during shutdown, results in additional hardware and process control considerations that add to the complexity and cost of the fuel cell power plant system, particularly with regard to the shift reactor.

Recent studies show that cerium oxide, or "ceria" ($CeO_2$), as well as other metal oxides, can be used as a support in combination with a noble metal or similar type catalyst to promote the shift reaction, eliminate the requirement that the catalyst be reduced, and provide a catalyst that is more oxygen tolerant than the prior catalysts. However, use of such support-promoted catalysts in a conventional manner in existing shift reactors may fail to provide the level of activity for the shift reaction to be useful in a reactor of a reasonable size in the intended operating environment. This is the case for the present two-stage adiabatic shift reactors, with the first stage (high temperature) being the relatively smaller, and the second stage (low temperature) being relatively larger. This is due to equilibrium limitations and low catalyst activity at the low temperatures of this second stage of the reactor. Collectively, an unreasonably large catalyst bed(s) and/or an additional selective oxidizer would be required, in order to reduce the CO to an acceptable level. This would be particularly burdensome in the instance of mobile fuel cell power plants, such as used in vehicles, where space and weight are at a premium.

A recent study has revealed that the removal of carbon monoxide may be enhanced by an oxygen-assisted water gas shift reaction over supported copper catalysts, however such copper catalysts suffer from the limitations discussed above.

It is thus an object of the present invention to provide a shift reactor of reduced spatial volume for effectively reducing the amount of carbon monoxide in a process gas stream, as for a fuel cell.

It is a further object to provide a method of operating a shift reactor in a manner and with such materials as to reduce the spatial volume required by such shift reactor to effect a desired reduction in the amount of carbon monoxide in a process gas stream.

It is a still further object of the invention to provide a shift reactor having the above properties and a tolerance for the presence of oxygen therein, thereby to minimize or eliminate the need for hydrogen reduction.

It is an even further object to provide a shift reactor of relatively reduced size with variable $O_2$ addition to enhance CO reduction for variable CO inputs.

DISCLOSURE OF INVENTION

A shift reactor for reducing the amount of carbon monoxide in a process gas, as for a fuel cell power plant, adds a limited quantity of oxygen to the reactor, to provide a further reaction of the carbon monoxide in addition to the water gas shift reaction. The further, or additional, reaction is believed to be an oxidation reaction, though may additionally or alternatively be another reaction such as a surface intermediate elimination reaction, or the like. The oxidation reaction is represented by the following equation:

$$CO + 1/2 O_2 \rightarrow CO_2. \qquad (2)$$

The oxygen added is less than about 2.0 mol %, being in the range of about 0.01 to 2.0 mol %, and most typically about 0.2 mol %, or less. The shift reactor includes a reaction chamber, an inlet to the chamber for receiving the process gas and oxygen, an outlet downstream of the inlets for exit of effluent from the chamber, and a catalytic reaction zone between the inlets and the outlet. A catalyst bed, or combination of beds, makes up the catalytic reaction zone, and is selected, in combination with the addition of oxygen, to provide effective removal of carbon monoxide in a spatially-efficient manner without requiring hydrogen reduction and/or purging of the catalytic reaction zone. The catalyst bed comprises a catalytic material deposited on a promoted support. The catalyst is selected from the list of metals including the noble metals platinum, palladium, rhodium, rhenium, indium, silver, gold, osmium, and ruthenium, and the non-noble metals of chromium, manganese, iron, cobalt and nickel. The noble metals of platinum, palladium, rhodium and/or gold are preferred. The promoted support has desirable oxygen storage capacity, and includes at least metal oxides, alone or in combination, and may additionally include silica and/or alumina in combination with the metal oxides. A preferred combination of metal oxides includes ceria and zirconia.

The use of a metal catalyst, preferably of noble metal, a promoted support having desirable oxygen storage capacity, and a small, variable amount of oxygen added to the catalytic reaction zone, yield both a water gas shift reaction and an oxidation reaction which efficiently reduce the carbon monoxide content in the process gas while economizing on the volumetric requirements and complexity of the shift reactor. Moreover, the operation of the shift reactor with these supported catalysts obviates the prior requirements for pre-reducing the catalyst, providing a special post shutdown purge, and maintaining an inert atmosphere during shutdown.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
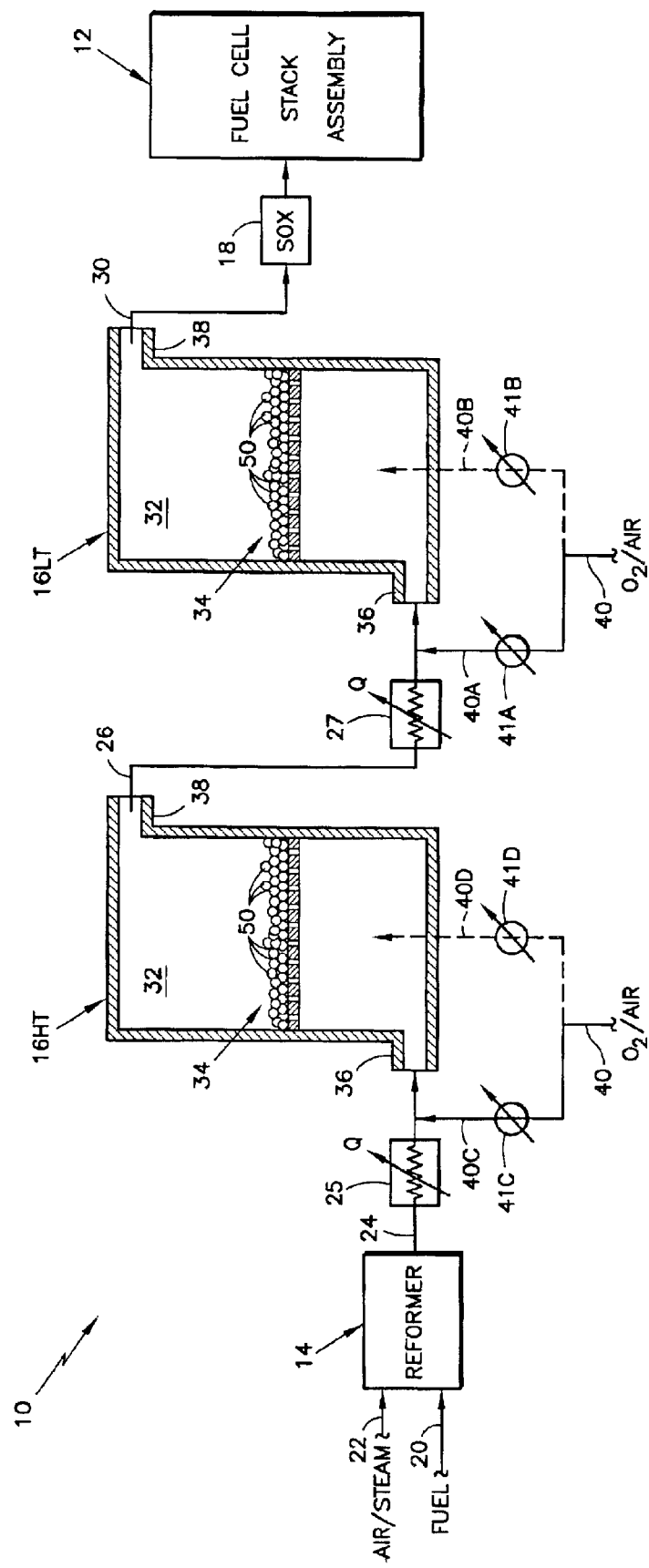
FIG. 1 is a simplified functional schematic diagram of a representative fuel cell power plant, depicting one or more shift reactors employing the addition of oxygen in accordance with the invention.

Referring to FIG. 1, there is depicted in functional schematic form, a fuel cell power plant 10. The power plant 10 includes a fuel cell stack assembly 12 of conventional design and construction, and a fuel processing subsystem which includes a reformer 14 and a shift reactor, in the illustrated embodiment comprised of high and low temperature, water gas shift reactors 16HT and 16LT, respectively. The subsystem typically also includes a selective oxidizer 18. The fuel processor converts a hydrocarbon fuel source into a hydrogen-rich stream of fuel which is supplied as the fuel to the fuel cell stack assembly 12. Typically, the hydrocarbon fuel source is a liquid, such as gasoline, or a gas, such as methane, natural gas, or the like, and is supplied to the Fuel inlet 20 of reformer 14. Air and/or steam is/are supplied to the Air/Steam inlet 22 of reformer 14. The reformer 14 reacts hydrocarbon fuel and normally steam and/or air to reform the hydrocarbon to yield hydrogen ($H_2$), carbon monoxide (CO), carbon dioxide ($CO_2$), and residual steam/water ($H_2O$), in a well-known manner. However, to further reduce or minimize the presence of carbon monoxide (CO) which otherwise "poisons" the anodes of the fuel cell stack assembly, and to increase the yield of hydrogen in the hydrogen-rich fuel source for the fuel stack assembly 12, the effluent process gas from the reformer 14 is conducted, via conduit 24, through a heat exchanger 25 and to the shift reactors 16HT and 16LT, where the carbon monoxide is converted to carbon dioxide.

The shift reactors 16HT and 16LT carry out exothermic shift reactions as noted in the formula (1) expressed in the Background Art above. The desired reaction in the shift reactors 16HT and 16LT is the conversion of carbon monoxide and water to carbon dioxide and hydrogen. The resultant effluent gas stream is intended to be sufficiently rich in hydrogen and depleted of carbon monoxide, particularly after further reduction in the CO level by passing through the selective oxidizer 18 via conduit 30, to meet the needs of the fuel cell stack assembly 12 to which it is supplied. However, in accordance with the invention, oxygen is also added, or introduced, to one, or both, of the shift reactors 16HT and 16LT, as depicted by conduit(s) 40 comprised of one or more branch conduits 40A, 40B, 40c, and 40D, to create and support a further reaction, or reactions, such as an oxidation reaction which converts additional amounts of carbon monoxide to carbon dioxide. That oxidation reaction is as noted in formula (2) expressed in the Disclosure of Invention above, and is carried out in the presence of $H_2O$ and $H_2$. This serves to further increase the amount of CO removed from the process gas received from the reformer 14, or conversely, to decrease the level of CO. The CO level in the process gas stream exiting the final shift reactor 16LT is designed to be no greater than 10,000 PPM, with less than 6,000 PPM being preferred, in accordance with the invention.

Each shift reactor 16HT and 16LT includes a housing having a catalyst chamber 32 containing one or more catalyst beds or functionally equivalent structures, 34, for promoting the desired shift reaction. The shift reactors 16HT and 16LT are typically both of the adiabatic type, with the former conducting the shift reaction at a higher temperature than the latter. The effluent from high temperature shift reactor 16HT is conveyed, via conduit 26, through a temperature-reducing heat exchanger 27 to the low-temperature shift reactor 16LT. The process gas from the reformer 14 enters shift reactor 16HT at inlet 36, flows through the catalyst bed(s) 34 in the catalyst chamber 32, and exits via outlet 38. The effluent process gas from shift reactor 16HT passes through heat exchanger 27 and similarly enters the low temperature shift reactor 16LT at its inlet 36, flows through the catalyst bed(s) 34 in the catalyst chamber 32, and exits via outlet 38.

Similarly, oxygen ($O_2$), which may be supplied in various forms, including as air, is also supplied to one or both of the shift reactors 16HT and 16LT via a supply conduit 40 and respective branch conduits 40C and/or 40D and 40A and/or 40B. The $O_2$ supply conduits 40A, 40b, 40C and/or 40D each include respective valves 41A, 41B, 41C, and/or 41D for variably controlling the amount of $O_2$ admitted. The $O_2$ may be mixed with the process gas from reformer 14 prior to being flowed across the catalyst bed 34 of reactor 16HT, as represented by $O_2$ supply branch 40C and/or it may be injected at one or more points along the bed 34, as represented by supply branch 40D. Similarly, the $O_2$ may be mixed with the process gas from shift reactor 16HT prior to being flowed across the catalyst bed 34 of reactor 16LT, as represented by $O_2$ supply branch 40A and/or it may be injected at one or more points along the bed 34, as represented by supply branch 40B. In the illustrated embodiment, the $O_2$ is seen as entering both shift reactors 16HT and 16LT via inlets 36, as depicted by solid line supply branches 40C and 40A respectively, whereupon the $O_2$ and the process gas become mixed. It will be appreciated, however, that the $O_2$ may additionally, or alternatively, be introduced to the process gas stream somewhat upstream or downstream of the inlets 36, with the latter locations being represented by the broken-line supply branches 40D and 40B extending to the beds 34, but at least initially upon, or before, reaching the catalyst bed 34 of the low temperature shift reactor 16LT. As noted above, some further addition of $O_2$ may also occur in the region of the catalyst bed 34.

Each catalyst bed 34 contains a catalyst composition, or simply, catalyst, 50, formulated for improving the performance of the shift reactor 16 with the addition of $O_2$ in accordance with the invention. Although the catalyst 50 is depicted here as being in a classic horizontal type bed 34 within the catalyst chamber 32, it will be appreciated, that other arrangements for supporting the catalyst 50 within the catalyst chamber 32 are well known and are contemplated as alternatives. For instance, a preferred arrangement may be that of a honeycomb-type structure of ceramic, alumina, cordierite (alumina/magnesia/silica), or the like, mounted in the catalyst chamber 32 and containing the catalyst as a coating thereon. For ease of reference herein, any and all such configurations for the catalyst 50 are referred to as a "bed " 34, and may even vary from one reactor to the next in a system with respect to configuration and/or catalyst composition.

It has been found that the combined water gas shift reaction and the oxidation reaction of the invention occur most efficiently, and without the requirement of supplemental purges or reductions, if the catalyst 50 is a formulation of a metal, including certain noble metals and certain non-noble metals, on a promoted support of at least one or more metal oxides. The noble metals consist of rhenium, platinum, palladium, rhodium, ruthenium, osmium, iridium, silver, and gold. The certain non-noble metals are from the group consisting of chromium, manganese, iron, cobalt, and nickel. Platinum, palladium, rhodium and/or gold, alone or in combination, are generally preferred. Platinum is particularly preferred because it provides the level of activity required to obtain a desired level of activity in a reactor of relatively compact space/volume. This is particularly so with the selection of a metal oxide promoted support for the catalyst, which metal oxides have desirable oxygen storage capabilities. These metal oxides include oxides of cerium (ceria), zirconium (zirconia), titanium (titania), yttrium (yttria), vanadium (vanadia), lanthanum (lanthania), and neodymium (neodymia), with ceria and/or zirconia being generally preferred, and a combination of the two being particularly preferred. The published literature describes the high oxygen storage capability and increased water gas shift activity of Ce/Zr mixed oxides, particularly when used to support automotive exhaust catalysts.

Returning to a consideration of the reaction dynamics in the shift reactor(s) 16HT and 16LT, the supplemental $O_2$ is added to the process gas stream as noted above. The addition of a small amount of $O_2$ into the reactor(s) 16HT and/or 16LT allows both CO and $H_2$ oxidation reactions to occur in that region. Ceria-based catalysts 50, for example, are active for CO oxidation in a temperature range of 200° to 300° C. This temperature range is most typically, though not exclusively, associated with a low temperature shift reaction, such as provided in reactor 16LT. In addition to the oxidation of CO to create $CO_2$, some $H_2$ is also oxidized, thereby creating $H_2O$. This latter reaction is not beneficial to the process as it removes some $H_2$, but it can be tolerated if the amounts are sufficiently small relative to the conversion of CO to $CO_2$. The amount of CO converted to $CO_2$, relative to the total $O_2$ consumed in the oxidation process is termed the "selectivity", and is dependent upon the catalyst 50 and the operating temperature. It is generally desirable to operate such that the selectivity is relatively large because the higher the selectivity for CO, the less H2 is consumed and is thus available for use in the fuel cell. However, in the practical operating temperature ranges mentioned above for the WGS reaction, the selectivity for CO will typically be upward to only about 90%, depending on O2 level, temperatures, and catalyst.

Further still, it is believed the temperature profile in the reactor(s) 16HT and 16LT is, or may be, raised due to the highly exothermic reactions which occur, as enhanced by the addition of the $O_2$. Adding a small amount of $O_2$ is believed to increase the temperature within the catalyst bed(s) 34, so that shift activity is similarly increased. This is beneficial when combined with the added conversion of CO to $CO_2$ via the oxidation reaction. The O2 amount and/or point of injection may be varied, to control the temperature rise if necessary.

Figure 2:
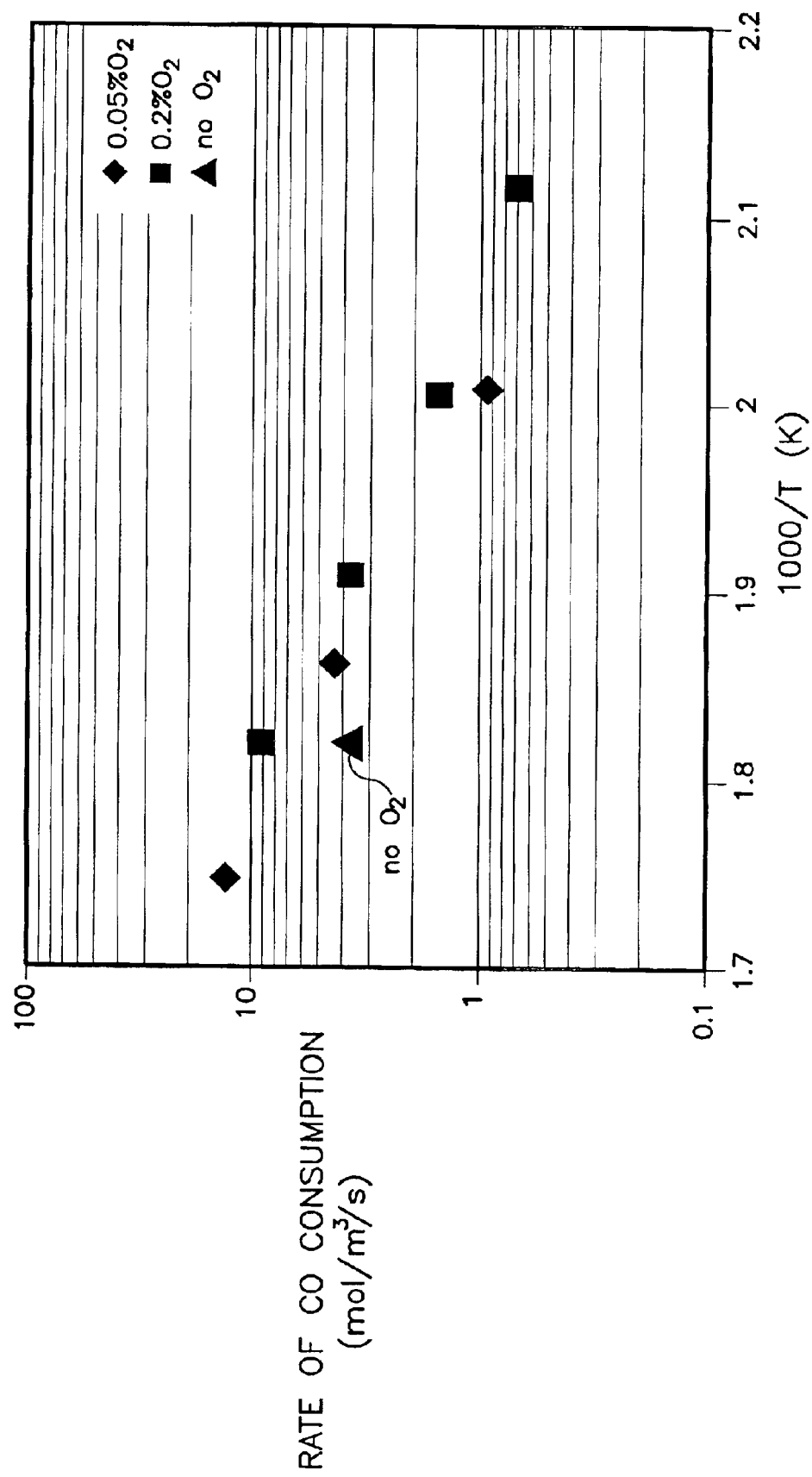
FIG. 2 is a graph depicting the effect of different oxygen addition levels.

Referring to FIG. 2, there is graphically depicted the effect on the reaction rate of CO consumption caused by adding different levels of $O_2$ to reactor, such as reactor 34LT, for a particular catalyst bed 34 and point of entry, at different thermal conditions. The reaction rate is a logarithmic measurement of mols of CO consumed per cubic meter of catalyst 50 per second. The thermal conditions are normalized and expressed as a number represented by 1000 divided by the Kelvin (Celsius+273) operating temperature. A single data point is presented (as a triangle) for the condition of "no O2" addition, and is seen to have a reaction rate of about "3.8" at a nominal operating temperature normalized to about 1.82, or about 277° C. (550K). In comparison, several data points (diamond-shape) are presented for the situation in which 0.05% of $O_2$ by volume % is added to the reactor(s) 34, and several further data points (square) are presented for the addition of 0.2% $O_2$. The plot of the 0.05% $O_2$ data points represent a greater reaction rate than for the condition of no $O_2$, and the reaction rate for the 0.2% $O_2$ condition is somewhat greater still.

Figure 3:
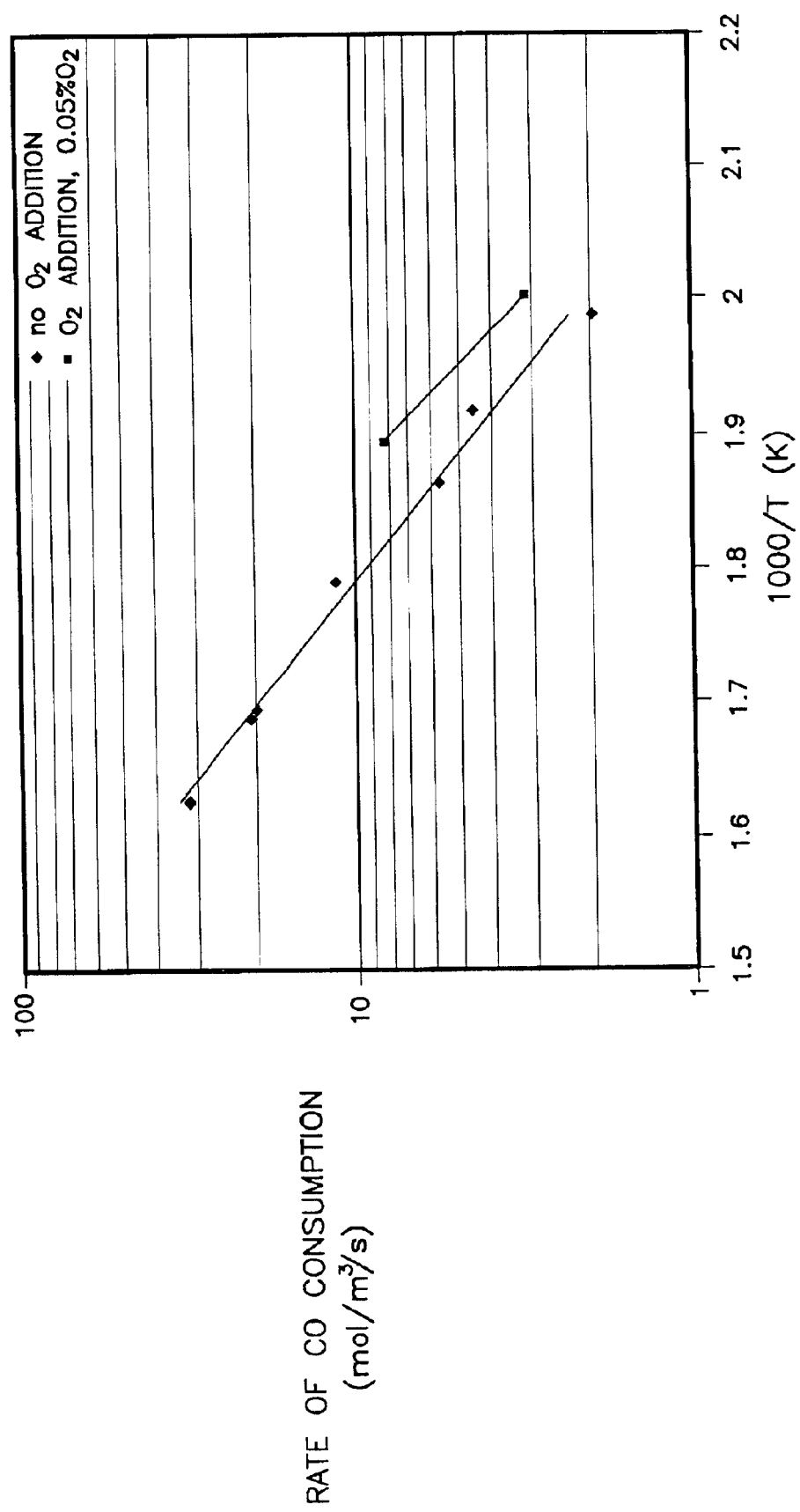
FIG. 3 is a graph depicting the effect of the addition of a particular level of oxygen on the performance of a specific catalyst.

The graph of FIG. 3 depicts the effect of the addition of 0.05% $O_2$ to the reactor(s) 16 having a particular catalyst 50. In this instance, the catalyst 50 is a proprietary ceria-based, noble metal water gas shift catalyst designated FCS-PMS-1, available as such from Süd Chemie Inc. of Louisville, Ky. It will be noted that the reaction rate at particular respective temperatures is significantly greater for the system having the added $O_2$, than for the system which does not have any $O_2$ added. This additional activity afforded by the relatively small addition of $O_2$ allows additional amounts of CO to be converted to $CO_2$ in a reactor of given size, thereby enabling the use of a more compact shift reactor system. It has been found that these benefits of oxygen addition are greatest for small amounts of $O_2$, typically less than 2%, and preferably less than 1%, with particularly good results being demonstrated for $O_2$ addition in the range of about 0.05% to 0.2%. This is so because, since the reactions at the desired temperature ranges are less than 100% selective relative to CO oxidation, it is desirable not to use $O_2$ at such levels as would increase $H_2$ consumption (into $H_2O$) and thereby decrease the efficiency of the fuel cell 12.

Figure 4:
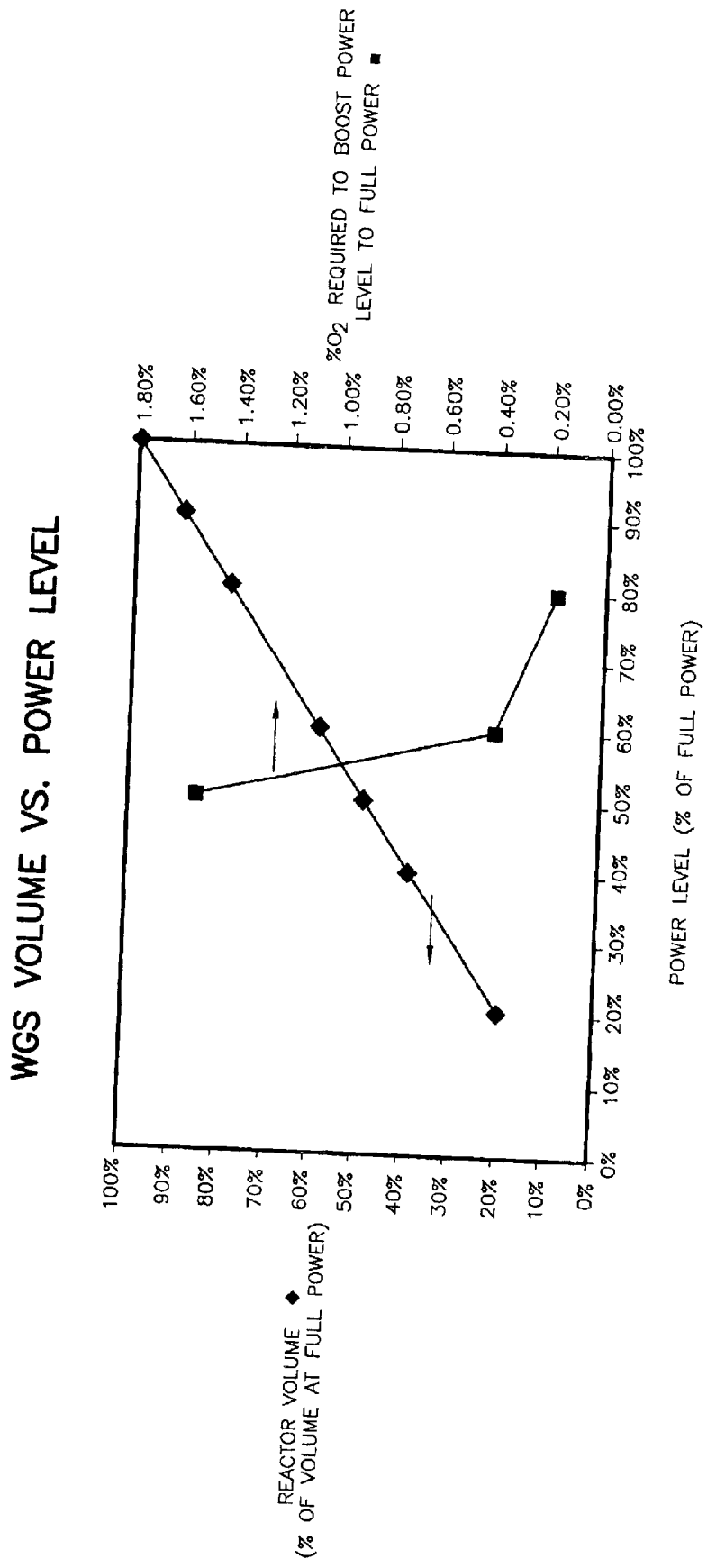
FIG. 4 is a graph depicting the correlation between water gas shift reactor volume, power level, and various $O_2$ input levels.

The advantage of adding $O_2$ to the WGS reactor(s) is further graphically depicted in FIG. 4, which presents the correlation of both reactor volume and $O_2$ addition to power level. Referring first to the plot (represented by the diamond shapes) of the relation between reactor volume and power level, it will be noted that there is a substantially linear and direct relation between the volume of a reactor and the power provided by that reactor. Stated another way, given a reactor which can provide a power level nominally designated "100%", another reactor of only ½ the volume will provide only ½ as much power, assuming no addition of $O_2$. However, the invention relies on the ability of added oxygen to increase the CO conversion and effectively enhance, or boost, the power level. This characteristic is seen in the plot (represented by the square shapes) of the relation between the power level (as a % of full power) and the % Of $O_2$ required to boost the power level to full power. Viewing the data point at the 50% power level setting, the addition of 1.6% $O_2$ will serve to effect an increase of the effective power level to full (100%) power. Similarly, if operating at a 60% power level setting, an addition of 0.4% $O_2$ attains the full power level. Further still, if operating at 80% of full power, the effective performance may be increased to full (100%) power by the addition of only about 0.2% $O_2$.

In view of the foregoing relationships, for a given maximum, or full, power level, it is possible to design and operate a smaller shift reactor than has heretofore been required and, with the addition of O2, to effect nominal full power performance. Although operating at 50% or 60% of full power level and adding 1.6 or 0.4% of O2 would seem to have appeal from the standpoint of compact initial size of the reactor, it has the drawback of the additional unwanted consumption of H2 and the requirement for frequent or constant addition of O2 when operating at all above 50% or 60% power level. On the other hand, by selecting an operating point of about 80% of full required power, some reduction in size of the shift reactor is accomplished, $O_2$ needs to be added only when power requirements exceed 80%, which occur much less frequently than for systems operating at the lower power levels, and far less $H_2$ is removed from the fuel supply and remains available for the fuel cell. For that reason, the latter operating configuration and regime is generally preferred. The resulting process gas stream exiting from the final shift reactor, in this instance 16LT, has a CO level of no more than 10,000 PPM, and preferably less than 6,000 PPM, and may be of reduced size relative to prior art systems required for the same full power levels. The $O_2$ may be selectively added in an increasing amount as the power level exceeds the 80% level.

Although the invention has been described and illustrated with respect to the exemplary embodiments thereof, it should be understood by those skilled in the art that the foregoing and various other changes, omissions and additions may be made without departing from the spirit and scope of the invention. For example, the water gas shift reactor, or reactors, may be singular or plural, and include single or multiple temperature stages, but at least include provision for adding $O_2$ to at least a portion thereof, typically via the process gas stream, for the purpose of limiting (or reducing) the reactor size for a given full power requirement. Although the term "oxygen" is used in the specification and claims, it will be understood that it may be supplied in various forms, including as air. Moreover, though an oxidation reaction is believed to be the mechanism by which additional carbon monoxide is converted to carbon dioxide, it is within the scope of the invention to include other reactions occasioned by the presence of the added oxygen as a, or the, mechanism which effects the enhanced conversion.

What is claimed is:

1. The method of reducing the amount of carbon monoxide in a process fuel gas, comprising the steps of:
    a. placing a catalyst bed (34, 50) in a water gas shift reactor (16HT, 16LT), the catalyst of the bed being selected from one or more metals from the group consisting of the noble metals and the group of non-noble metals consisting of chromium, manganese, iron, cobalt, and nickel, the one or more metals of the catalyst bed having a promoted support, the promoted support comprising at least a metal oxide;
    b. feeding (36) the process fuel gas into operative proximity with the catalyst bed (34, 50) to convert at least a portion of the carbon monoxide in the process fuel gas into carbon dioxide via a water gas shift reaction; and
    c. supplying oxygen (40, 40A, 40B, 40C, 40D, 41A, 41B, 41C, 41D) to the process fuel gas near, or prior to, the catalyst bed (34, 50) for further converting carbon monoxide in the process fuel gas, the quantity of oxygen being less than about 0.2 mol %.

2. The method of claim 1 wherein the step of supplying oxygen (40, 40A, 40B, 40C, 40D, 41A, 41B, 41C, 41D) to the process fuel gas comprises varying (41A, 41B, 41C, 41D) the quantity of oxygen supplied to attain a desired response.

3. The method of claim 1 wherein the step of supplying oxygen (40, 40A, 40B, 40C, 40D, 41A, 41B, 41C, 41D) to the process fuel gas near, or prior to, the catalyst bed (34, 50) effects an oxidation reaction for further converting carbon monoxide in the process fuel gas to carbon dioxide.

4. The method of claim 1 wherein the step of supplying oxygen (40, 40A, 40B, 40C, 40D, 41A, 41B, 41C, 41D) to the process fuel gas near, or prior to, the catalyst bed (34, 50) effects an oxidation reaction.

5. The method of reducing the amount of carbon monoxide in a process fuel gas, comprising the steps of:
    b. placing a catalyst bed (34, 50) in a water gas shift reactor (16HT, 16LT);
    b. feeding (36) the process fuel gas into operative proximity with the catalyst bed (34, 50) to convert at least a portion of the carbon monoxide in the process fuel gas into carbon dioxide via a water gas shift reaction; and
    c. supplying oxygen (40, 40A, 40B, 40C, 40D, 41A, 41B, 41C, 41D) to the process fuel gas near, or prior to, the catalyst bed (34, 50) for further converting carbon monoxide in the process fuel gas, the quantity of oxygen added to the process fuel gas being less than about 0.2 mol %.

* * * * *